United States Patent
Daoud

Patent Number: 6,031,182
Date of Patent: Feb. 29, 2000

[54] CONCENTRIC STRAIN RELIEF MECHANISM FOR VARIABLE DIAMETER CABLES

[75] Inventor: Bassel Hage Daoud, Parsippany, N.J.

[73] Assignee: Lucent Technologies Inc., Murray Hill, N.J.

[21] Appl. No.: 09/039,703

[22] Filed: Mar. 16, 1998

[51] Int. Cl.⁷ .................................................. H02G 3/18
[52] U.S. Cl. .................... 174/65 R; 174/65 G; 174/135; 174/152 G; 174/153 G; 16/2.1; 248/327
[58] Field of Search ................. 174/65 R, 65 G, 174/135, 151, 152 G, 153 G; 16/2.1, 2.2; 248/327

[56] References Cited

U.S. PATENT DOCUMENTS

| | | | |
|---|---|---|---|
| D. 287,963 | 1/1987 | Fasano et al. | D13/24 |
| 4,101,729 | 7/1978 | Balchunas | 174/65 R |
| 4,321,650 | 3/1982 | De Luca et al. | 361/119 |
| 4,575,169 | 3/1986 | Duplatre et al. | 339/44 |
| 4,645,284 | 2/1987 | Duplatre et al. | 339/94 |
| 4,651,340 | 3/1987 | Marson | 379/156 |
| 4,658,422 | 4/1987 | Sparks | 379/442 |
| 4,704,499 | 11/1987 | Faust | 174/92 |
| 4,740,168 | 4/1988 | Carney et al. | 439/133 |
| 4,752,232 | 6/1988 | De Luca | 439/133 |
| 5,044,981 | 9/1991 | Suffi et al. | 439/533 |
| 5,312,266 | 5/1994 | Daoud | 439/304 |
| 5,363,440 | 11/1994 | Daoud | 379/399 |
| 5,370,547 | 12/1994 | Daoud | 439/304 |
| 5,378,174 | 1/1995 | Brownlie et al. | 439/709 |
| 5,410,443 | 4/1995 | Pelegris | 361/119 |
| 5,568,362 | 10/1996 | Hansson | 361/736 |
| 5,803,292 | 9/1998 | Daoud | 220/4.02 |
| 5,886,298 | 3/1999 | Daoud | 174/65 G |

FOREIGN PATENT DOCUMENTS 094022195  9/1994  WIPO ................... 174/65 R

*Primary Examiner*—Kristine Kincaid
*Assistant Examiner*—Dhiru R Patel

[57] ABSTRACT

A strain relief mechanism for securing a cable that runs through a knockout portion disposed on the surface of a building entrance terminal is provided. The mechanism utilizes two or more brackets, where each bracket has a mounting and a clamping end. The mounting ends are fixedly securely to the inner surface of the building entrance terminal at a distance away from the knockout portion. The clamping portions are rotatable to constrain the circumference of the cable that is inserted into the building entrance terminal. A cable tie may be utilized for further constraining the clamping ends of the brackets about the cable.

11 Claims, 5 Drawing Sheets

CONCENTRIC STRAIN RELIEF MECHANISM FOR VARIABLE DIAMETER CABLES

FIELD OF THE INVENTION

This invention relates generally to a strain relief mechanism for securing a cable to a building entrance protector and, more particularly, to a bracket having mounting and clamping ends for constraining a circumference of the cable to a building entrance protector.

BACKGROUND OF THE INVENTION

Building entrance protectors are used to provide telephone or cable TV lines from the telephone or cable TV company's street cables to multiple tenants of residential or commercial buildings. Typically cable pairs extend into a splice unit disposed within the housing of the building entrance protector. Telephone and cable TV lines are then provided to a line protector unit that functions to suppress transient electrical signals resulting from thunderstorms and other environmental noises. Telephone and cable TV wires are then extended to various tenant locations within the building via an internal connection unit.

Building entrance protectors typically have holes on one or more sides to allow the cables to enter into the interior or extend to exterior of the housing. According to the prior art, many building entrance protectors come with concentric knockouts of varying sizes, which allows the user to gently hammer-out the knockout portion that is closer in size to the circumference of the cable being used while leaving the bigger-sized knockouts intact. Having concentric knockouts of varying sizes has the advantage of allowing greater flexibility in the use of cables of varying diameter sizes.

Often, however, the user will find a knockout size that is close to the cable's circumference, but not of precisely the same size. The removal of the knockout portion creates a hole through which the user can extend wires or a cable from inside the housing to the outside of the housing. Often it is desired to secure the cable that extends through the hole by a strain relief bracket so that external pulling forces on the cable would not disengage wiring connections.

Typically, a strain relief assembly comprises of an outside clamping assembly that includes two half cylindrical brackets that secure the cable by covering its circumference. The two half cylindrical brackets are then fastened together by two screws located on each side of the cylindrical brackets. The strain relief assembly also includes an inside C-clamp bracket that clasps the cable and is screwed on to the inside surface of the sidewall of the housing such as a building entrance protector just next to the hole in use. This may be problematic if the knockout being used is one of the smaller ones, and the inside C-clamp bracket has to be screwed on to the next concentric knockout portion of the building entrance protector. Since the perimeter of knockout portions have small grooves dug or scored into the box, these portions are not as strong as the rest of the sidewall surface of the building entrance protector and are incapable of retaining as much stress as the rest of the building entrance protector's surface. Thus, by screwing the bracket on these knockout portions, the user runs the risk of having all the concentric knockouts being dislodged if the cable is pulled.

Thus there is a need to overcome the disadvantages of brackets that are screwed on the concentric knockouts surrounding a hole through which a cable is being extended and retained by a relief mechanism.

SUMMARY OF THE INVENTION

In accordance with one embodiment of the invention, a building entrance terminal or the like comprises a strain relief mechanism for securing a cable that runs through an opening that is created by removing a knockout portion disposed on the surface of the building entrance terminal. The strain relief mechanism comprises at least two brackets. Each of the brackets has a mounting and a clamping end. The mounting end is firmly secured to the surface remote from the knockout portion of the building entrance terminal. The clamping ends of the bracket constrain the circumference of the cable that runs through the hole.

In accordance with another embodiment of the invention, the strain relief mechanism comprises three brackets each having mounting and clamping ends, and the mounting end being firmly secured to the surface remote from the knockout portion disposed on the surface of the building entrance terminal.

BRIEF DESCRIPTION OF THE DRAWINGS

The subject matter regarded as the invention is particularly pointed out and distinctly claims in the concluding portion of the specification. The invention, however, both as to organization and method of operation, together with features, objects and advantages thereof may best be understood by reference to the following detailed description when read with the accompanying drawings in which:

DETAILED DESCRIPTION OF THE DRAWINGS

Figure 1:
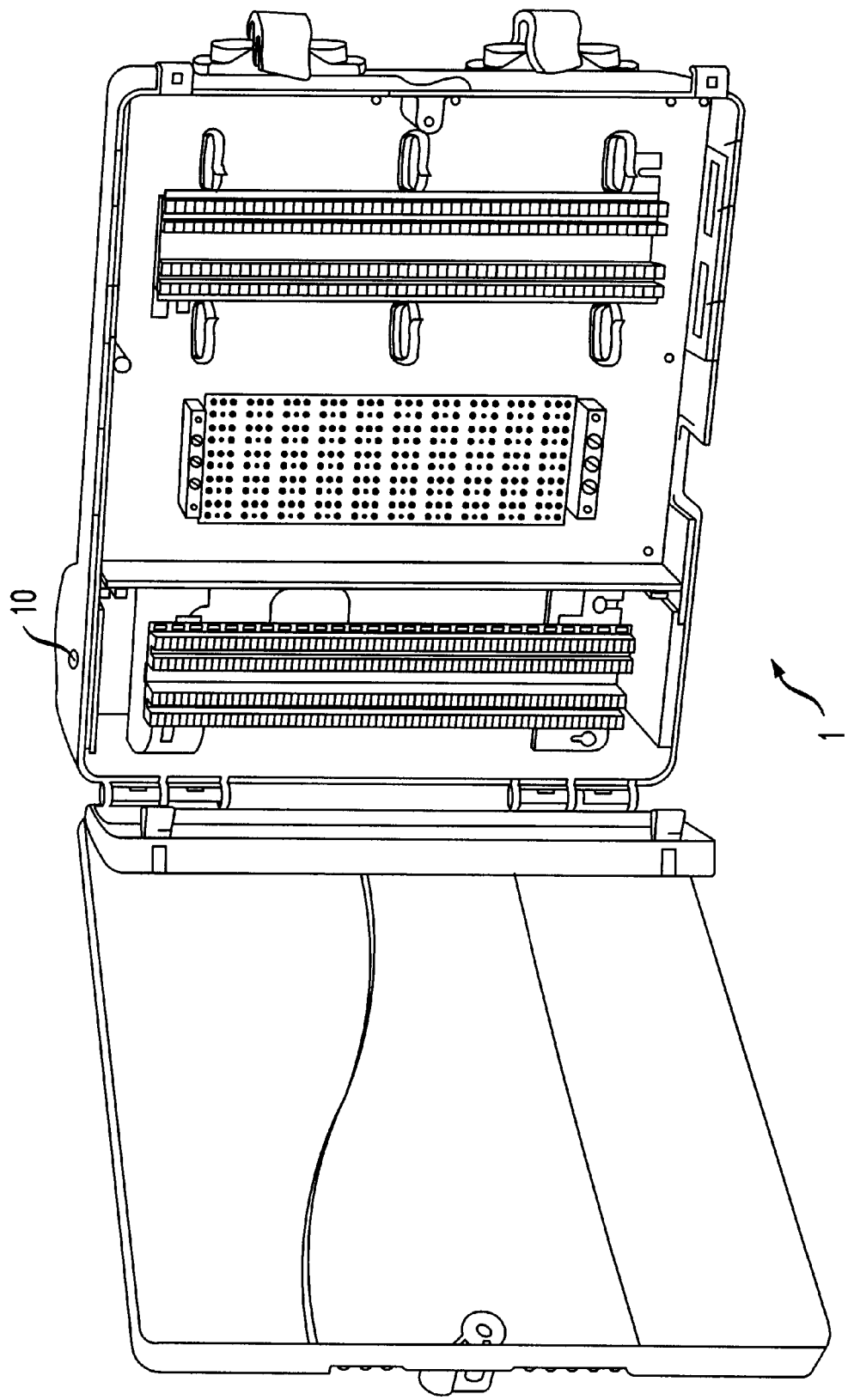
FIG. 1 illustrates a cross-sectional view of a building entrance protector.
Figure 2:
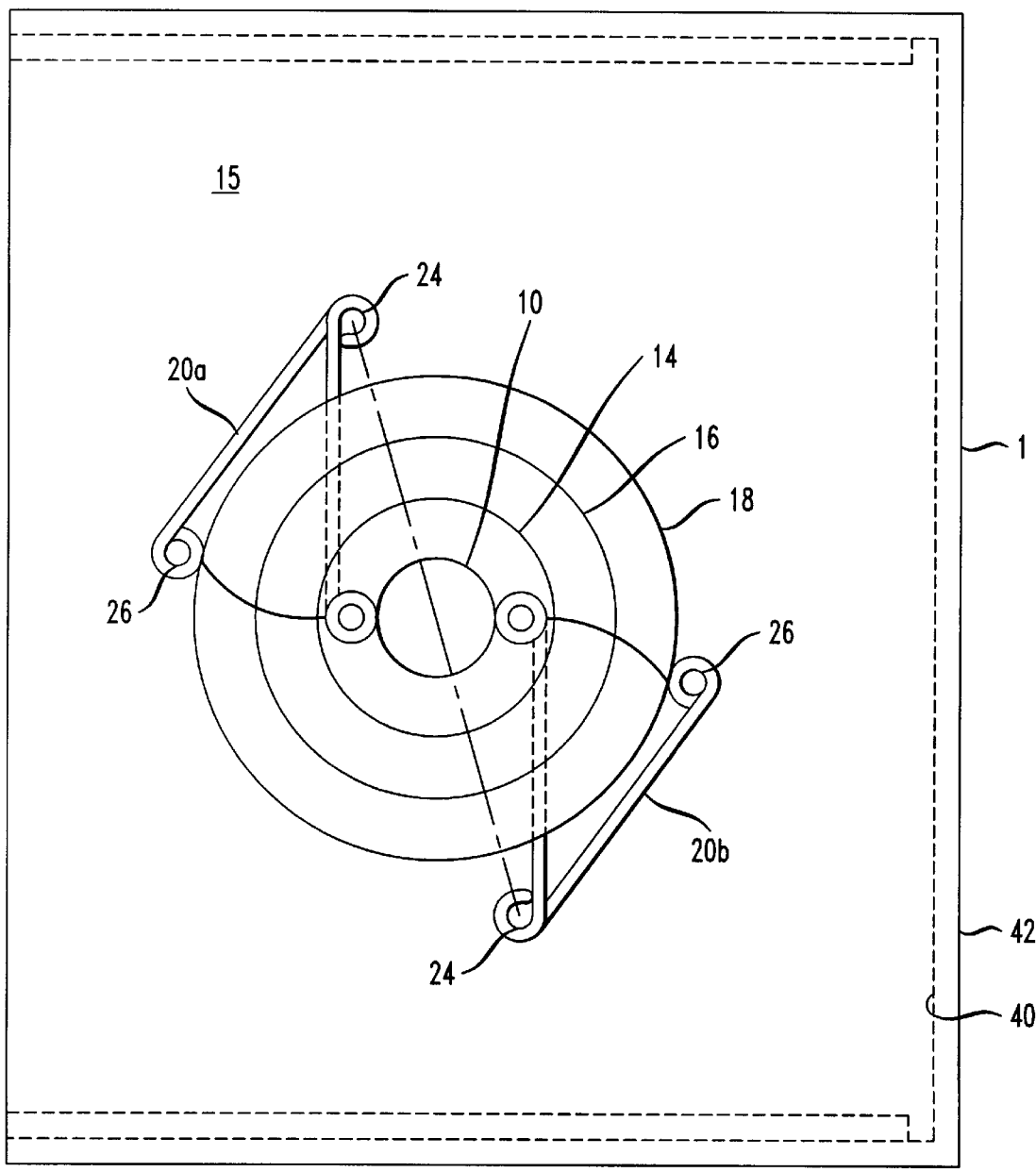
FIG. 2 illustrates a top view of the strain-relief mechanism for use in the building entrance protector that is illustrated in FIG. 1.

Referring initially to FIGS. 1 and 2, FIG. 1 illustrates a building entrance protector 1 having a knockout 10 on a side wall, the knockout being well known to those skilled in this field. While the knockout 10 is circular in shape, according to the present invention the knockouts may have any shape, such as rectangular, ovular, triangular, etc. FIG. 2 shows the knockout portion, as visualized for use with the present invention. The knockout portion shown has a plurality of concentric knockouts, such as first knockout 10, second knockout 14, third knockout 16 and fourth knockout 18. The knockout that is used is dependent on the size of the cable's circumference (not shown) that is to be inserted into the building entrance protector 1. Once the user has ascertained the appropriate knockout that needs to be removed for the cable to be inserted into building entrance protector 1, the user gently hammers out or punches out the knockout portion that is closest in size to the circumference of the cable being used, while leaving the bigger-sized knockouts intact.

Once the desired knockout has been removed and a cable inserted, strain relief mechanism 15 is utilized to firmly secure the cable in place. Strain relief mechanism 15 comprises two or more strain relief brackets 20. Strain relief brackets 20 may be made from metal or other substances, including ceramic or plastic. Each strain relief bracket 20 includes a mounting portion 24 that is firmly secured to inner surface 40 of the building entrance protector 1 at a distance away from the largest concentric knockout 18 or at a point outside the knockout 18. The other end of strain relief bracket 20 is a clamping portion 26 that constrains the circumference of the inserted cable. Even though the mounting portion 24 is firmly secured to the inner surface 40 of the building entrance protector 1, it is possible to rotate or bend each of the strain relief brackets 20a and 20b to and from the inserted cable to facilitate the user in firmly securing cables of varying circumferences. In the event that the inner knockout 10 is used, all of the remaining outer concentric knockouts remain intact.

It is preferred that the two strain relief brackets 20a, 20b are arranged such that clamping portion 26 of the two brackets 20a, 20b firmly constrains the circumference of the cable from diagonally-opposite ends, as shown in FIG. 2. However, it is still possible to use the strain relief mechanism 15 even where the strain relief brackets 20a, 20b are positioned in such a manner that it is not possible to clasp the inserted cable from diagonally-opposite ends. In another embodiment of the present invention, clamping portion 26 is a C-shaped clasp.

Figure 3:
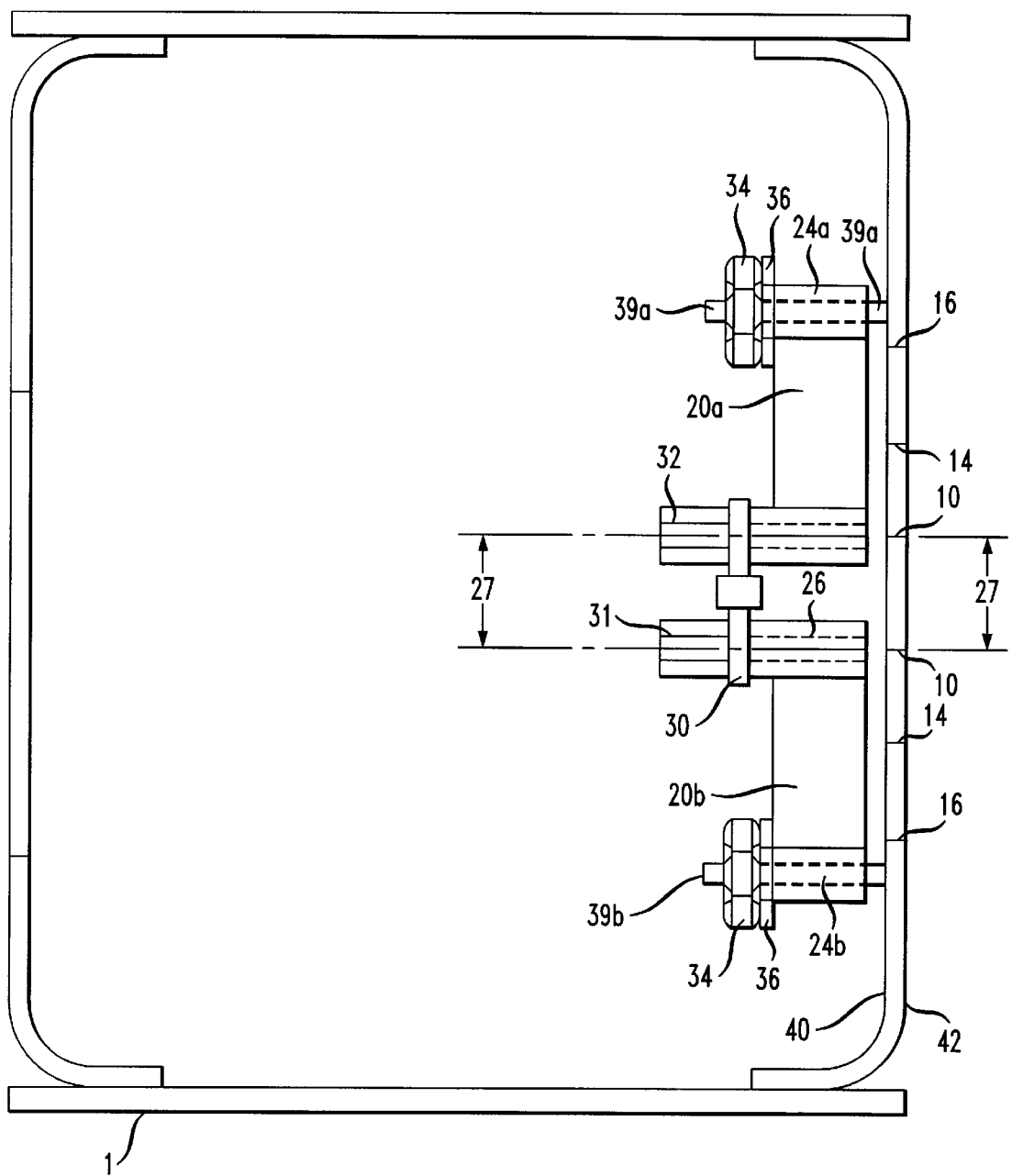
FIG. 3 illustrates a front view of the strain-relief bracket that is illustrated in FIG. 2.

As shown in FIG. 3, strain relief mechanism 15 is in operation in its preferred mode, where clamping portions 26 are on the diagonally opposite ends of cable 27. Strain relief brackets 20a, 20b are mounted on the inner surface 40 of building entrance protector 1 by firmly securing mounting portions 24a, 24b to studs 39a, 39b which protrudes from inner surface 40. The building entrance protector may have two or more studs 39a, 39b coupled onto the inner surface 40. Studs 39a, 39b may be nuggets that are firmly secured to the surface 40 by a welding process or simple screws that are screwed onto the surface 40 through the outside surface 42 of the building entrance protector 1. Studs 39a, 39b can be manufactured from a variety of different materials, including metal or plastic.

A lock nut 34 is used to firmly secure the mounting ends 24a, 24b of strain relief brackets 20a, 20b onto stud 39a, 39b. It is preferred that a flat washer 36 be placed between lock nut 34 and the top surface of the strain relief brackets 20a, 20b. The flat washer may be constructed from any flexible materials to allow for even distribution of the force exerted by lock nut 34 on strain relief brackets 20a, 20b onto stud 39a, 39b.

In a preferred embodiment, clamping portion 26 of strain relief brackets 20a, 20b has a knurled surface 31, as shown in FIG. 3, to increase the friction between clamping portion 26 and the circumference of the inserted cable 27. As is evident, the increase in friction helps to hold cable 27 in place more securely. A tie 30 is wrapped around the two clamping portions 26 so as to securely retain cable 27 and to ensure that strain relief brackets 20a, 20b are prevented from moving away from each other. Tie 30 can be made from any substance that enables the user to secure the cables together. For example, tie 30 may be a simple cable tie made from plastic or a hose clamp similar to those readily available in the market.

Figure 4:
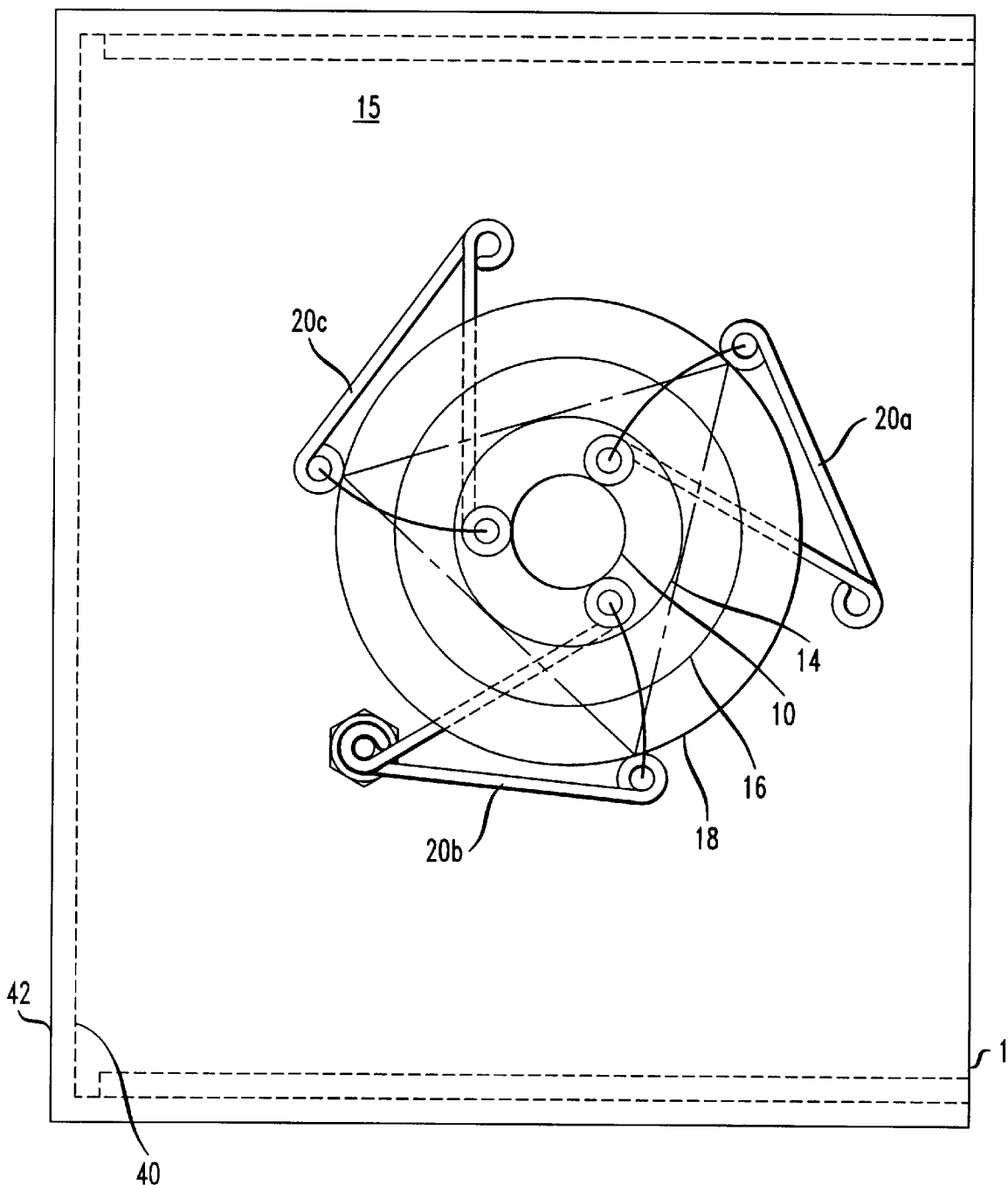
FIG. 4 illustrates a cross-sectional view of another embodiment of the strain-relief mechanism.

FIG. 4 shows another embodiment of strain relief mechanism 15 that utilizes three strain relief brackets 20 a, b and c. While generally two or three strain relief brackets 20 a, b and c will be used to constrain the cable in the hole created by removing the pertinent knockout, such as knockout 10 in FIG. 2, it is possible to use more than three strain relief brackets 20 a, b and c.

Figure 5:
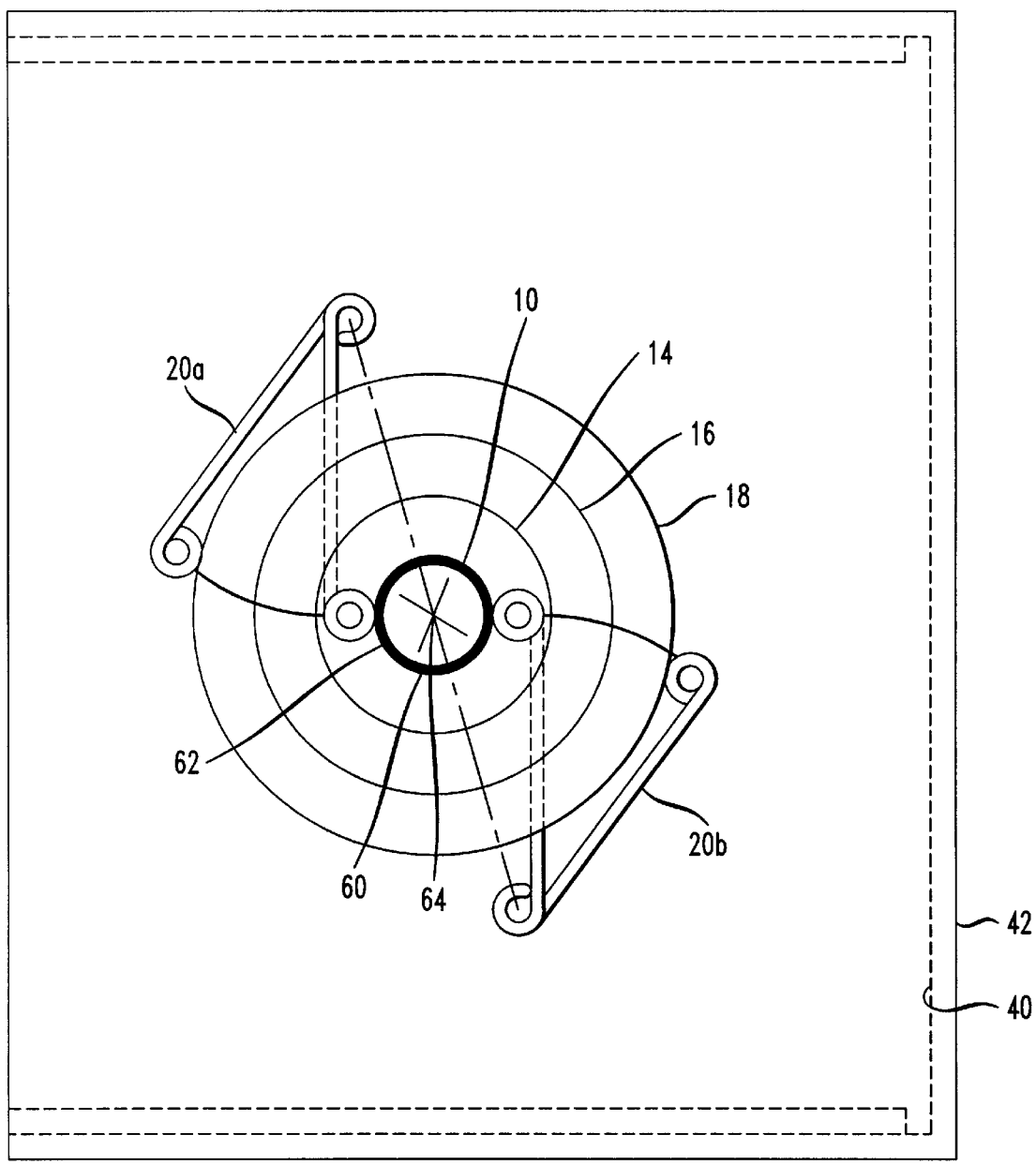
FIG. 5 illustrates the top view of embodiment of the strain-relief mechanism illustrated in FIG. 4 that utilizes a grommet in the knockout through which a cable passes.

In another embodiment of strain relief mechanism 15, a grommet 60 may be provided to be inserted around the knockout portion 10 that is removed, as shown in FIG. 5.

Thus, grommets of different sizes are to be provided to correspond with the various knockout sizes. Grommet 60 helps to cover edges 62 of the removed knockout portion which may be sharp enough to tear into the cable's side. Grommet 60 is provided with a cross-shaped slit 64 in the center of its surface that may be sliced to allow cable 27 to pass through grommet 60. It is preferable that grommet 60 be made from a flexible material, such as rubber or plastic, to allow for more flexibility with respect to the cable being inserted.

Thus, the present invention provides a secure strain relief mechanism without the disadvantages of prior art systems such as inadvertent removal of larger knockout portions caused by pulling forces on the bracket.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

What is claimed is:

1. A strain relief mechanism for securing a cable, said mechanism comprising:

a surface having a knockout portion; and first and second brackets, wherein each of said brackets is rotatably secured to a surface at a location distal to said knockout portion, such that each of said brackets is rotatably adjustable along a rotation axis defined by said location so as to constrain said cable when said cable runs through a hole created by removing said knockout portion.

2. The strain relief mechanism according to claim 1, wherein said first and second brackets are provided with inner and outside sides, said inner sides being proximate to the cable and provided with a knurled surface.

3. The strain relief mechanism according to claim 1, wherein said surface comprises a plurality of concentric knockout portions and each of said brackets is secured to said surface at a location distal to one of said knockout portions having a diameter that is larger than each of the remaining knockout portions.

4. The strain relief mechanism according to claim 1, further comprising a stud coupled to said surface and further comprising a lock nut for fixedly securing said first bracket to said stud.

5. The strain relief mechanism according to claim 1, further comprising a cable tie for constraining said first and second brackets about the circumference of the cable.

6. The strain relief mechanism according to claim 5, wherein said cable tie is a hose clamp.

7. The strain relief mechanism according to claim 1, further comprising a third bracket, wherein said third bracket is fixedly secured to said surface at a point distal to the knockout portion, said third bracket constraining the circumference of the cable.

8. The strain relief mechanism according to claim 1, wherein said strain relief mechanism is provided with a building entrance terminal.

9. The strain relief mechanism according to claim 1, further comprising a grommet, said grommet secured to the peripheral edge of the knockout portion.

10. The strain relief mechanism according to claim 9, wherein said grommet has a sliceable split in its center.

11. The strain relief mechanism according to claim 10, wherein said grommet is made from plastic.

* * * * *